US006151133A

United States Patent [19]
Sakauchi et al.

[11] Patent Number: 6,151,133
[45] Date of Patent: Nov. 21, 2000

[54] DATA COMMUNICATION APPARATUS HAVING A DISPLAY DEVICE, ON WHICH SEVERAL TYPES OF INFORMATION IS SEQUENTIALLY DISPLAYED, AND A PRINTING DEVICE

[75] Inventors: Tomomi Sakauchi, Tokyo; Hiroshi Fukada, Yokohama, both of Japan

[73] Assignee: Canon Kabushiki Kaisha, Tokyo, Japan

[21] Appl. No.: 08/422,610

[22] Filed: Apr. 13, 1995

Related U.S. Application Data

[63] Continuation of application No. 08/073,306, Jun. 8, 1993, abandoned.

[30] Foreign Application Priority Data

Jun. 12, 1992 [JP] Japan ................................ 4-179438

[51] Int. Cl.[7] .............................. G06F 15/00; H04N 1/32
[52] U.S. Cl. ....................................... 358/1.15; 358/468
[58] Field of Search ................................ 358/468, 442, 358/452, 444, 440, 400, 404, 406, 470, 403, 453, 434, 407, 438, 1.1, 1.9, 1.15, 1.16, 1.13; H04N 1/32

[56] References Cited

U.S. PATENT DOCUMENTS

| 4,148,066 | 4/1979 | Saycor | 358/470 |
|---|---|---|---|
| 4,587,633 | 5/1986 | Wang et al. | 358/462 |
| 4,754,335 | 6/1988 | Izawa | 358/256 |
| 4,760,458 | 7/1988 | Watanabe et al. | 358/470 |
| 4,907,274 | 3/1990 | Nomura et al. | 379/100 |
| 4,964,039 | 10/1990 | Izawa et al. | 364/200 |
| 5,040,077 | 8/1991 | Hamano | 358/434 |
| 5,084,770 | 1/1992 | Nakayama | 358/403 |
| 5,109,434 | 4/1992 | Shimizu et al. | 382/41 |
| 5,119,081 | 6/1992 | Ikehira | 340/723 |
| 5,142,618 | 8/1992 | Fujiwara | 395/146 |
| 5,199,063 | 3/1993 | Erickson et al. | 358/400 |
| 5,216,517 | 6/1993 | Kinoshita et al. | 358/400 |
| 5,272,543 | 12/1993 | Yanagisawa | 358/403 |
| 5,283,665 | 2/1994 | Ogata | 358/434 |
| 5,325,309 | 6/1994 | Halaviati et al. | 364/488 |
| 5,327,264 | 7/1994 | Iyama | 358/515 |
| 5,340,966 | 8/1994 | Morimoto | 358/408 |
| 5,392,131 | 2/1995 | Umeno | 358/403 |
| 5,408,333 | 4/1995 | Kojima et al. | 358/402 |
| 5,448,626 | 9/1995 | Kajiya et al. | 379/67 |
| 5,452,093 | 9/1995 | Kwak | 358/296 |
| 5,493,408 | 2/1996 | Kurogane | 358/442 |

FOREIGN PATENT DOCUMENTS

| 2-113757 | 4/1990 | Japan | H04L 29/14 |
|---|---|---|---|
| 3-54925 | 3/1991 | Japan | H04B 7/26 |
| 1-270137 | 10/1999 | Japan | G06F 15/20 |

OTHER PUBLICATIONS

The Complete Fax/9600, Chapter 1, 7, 8—The Complete PC, Inc—Oct. 1988.

*Primary Examiner*—Madeleine Nguyen
*Attorney, Agent, or Firm*—Fitzpatrick, Cella, Harper & Scinto

[57] ABSTRACT

A facsimile apparatus according to the present invention has a display device and a printing device; the display device sequentially displays several types of information, for example a condition of the apparatus, a condition of storing an image transmission a result of a facsimile communication, etc., in response to each manual instruction by an operator. If the operator inputs a manual instruction for printing, the apparatus causes the printing device to print out a report relating to the information to be displayed by the display device so that the operator quickly knows that several kinds of information by watching the printed report without inputting each manual instructions.

12 Claims, 12 Drawing Sheets

```
***************
**  MONITOR REPORT  ***
***************
```
93/03/10  13:00      P.001

| ITEM | TELEPHONE NO. | NUMBER OF PAGES | START TIME | | |
|---|---|---|---|---|---|
| TRANSMISSION | 0354827200 | 003 | 11:00 | | |
| RECEIVING | 0354827202 | 001 | 11:05 | | |
| WAITING FOR REDIALING | 0757827200 | 002 | 13:30 | | |
| WAITING FOR REDIALING | 0312345678 | 001 | 14:30 | | |
| RESERVATION | 0354827201 | 002 | 13:35 | | |
| TIMER TRANSMISSION | 0375827205 | 002 | 15:00 | | |
| TIMER TRANSMISSION | 0757827206 | 005 | 20:00 | | |
| TIMER TRANSMISSION | 0354827207 | 001 | 22:00 | | |
| POLLING TRANSMISSION | 0354827208 | 003 | 10:00 | | |
| WAITING FOR POLLING | | 002 | 14:50 | | |
| RESULT OF COMMUNICATION (OK) | 0375790871 | 003 | 12:00 | 30 YEN | |
| RESULT OF COMMUNICATION (OK) | 0354827200 | 002 | 17:20 | 20 YEN | |
| RESULT OF COMMUNICATION (NG) | 0354827223 | 001 ▣ | 17:25 | | |

FIG.15

```
* * * * * * * * * * * *
* * TIMER TRANSMISSION * *
* *      REPORT      * *
* * * * * * * * * * * *
```

93/03/10  13:00   P.001

| ITEM | TELEPHONE NO. | NUMBER OF PAGES | START TIME |
|---|---|---|---|
| TIMER TRANSMISSION | 0375827205 | 002 | 15:00 |
| TIMER TRANSMISSION | 0757827206 | 005 | 20:00 |
| TIMER TRANSMISSION | 0354827207 | 001 | 22:00 |
| TIMER POLLING | 0354827208 | 003 | 10:00 |

DATA COMMUNICATION APPARATUS HAVING A DISPLAY DEVICE, ON WHICH SEVERAL TYPES OF INFORMATION IS SEQUENTIALLY DISPLAYED, AND A PRINTING DEVICE

This application is a continuation of application Ser. No. 08/073,306, filed Jun. 8, 1993, now abandoned.

BACKGROUND OF THE INVENTION

1. Field of the Invention

The present invention relates to a data communication apparatus having a display device, on which several types of information is sequentially displayed in response to each manual instruction by an operator, and a printing device.

2. Related Background Art

A facsimile apparatus is one type of conventional data communication apparatus. A facsimile apparatus may utilize a LCD (Liquid-Crystal Display device) as a display device. The facsimile apparatus causes the LCD to sequentially display several kinds of information, for example: the present mode of the apparatus (i.e. transmission mode, reception mode or copy mode), a condition of transmitting, a condition of receiving or a result of transmitting or receiving, etc, in response to each manual instruction entered by an operator. In a situation where an operator wishes to know the result of transmitting and the result is not displayed until late in the order of information, the operator has to enter many instructions until the result of transmitting is displayed by the LCD. Therefore the operation for displaying in a conventional apparatus is complicated.

SUMMARY OF THE INVENTION

In consideration of the foregoing, one object of the present invention is to provide an improved data communication apparatus.

Another object of the present invention is to provide a data communication apparatus capable of quickly providing an operator with desired information without a complicated operation.

These objects are accomplished by providing a data communication apparatus having means for sequentially displaying several kinds of information in response to each manual instruction entered by an operator, means for printing information corresponding to the information to be displayed, and control means for causing the printing means to print out the information in response to a manual instruction for printing.

Still other objects of the present invention, and the advantages thereof, will become fully apparent from the following description of the embodiments to be take in conjunction with the attached drawings.

DETAILED DESCRIPTION OF THE PREFERRED EMBODIMENTS

Now the present invention will be clarified in detail by embodiments thereof shown in the attached drawings.

Figure 1:
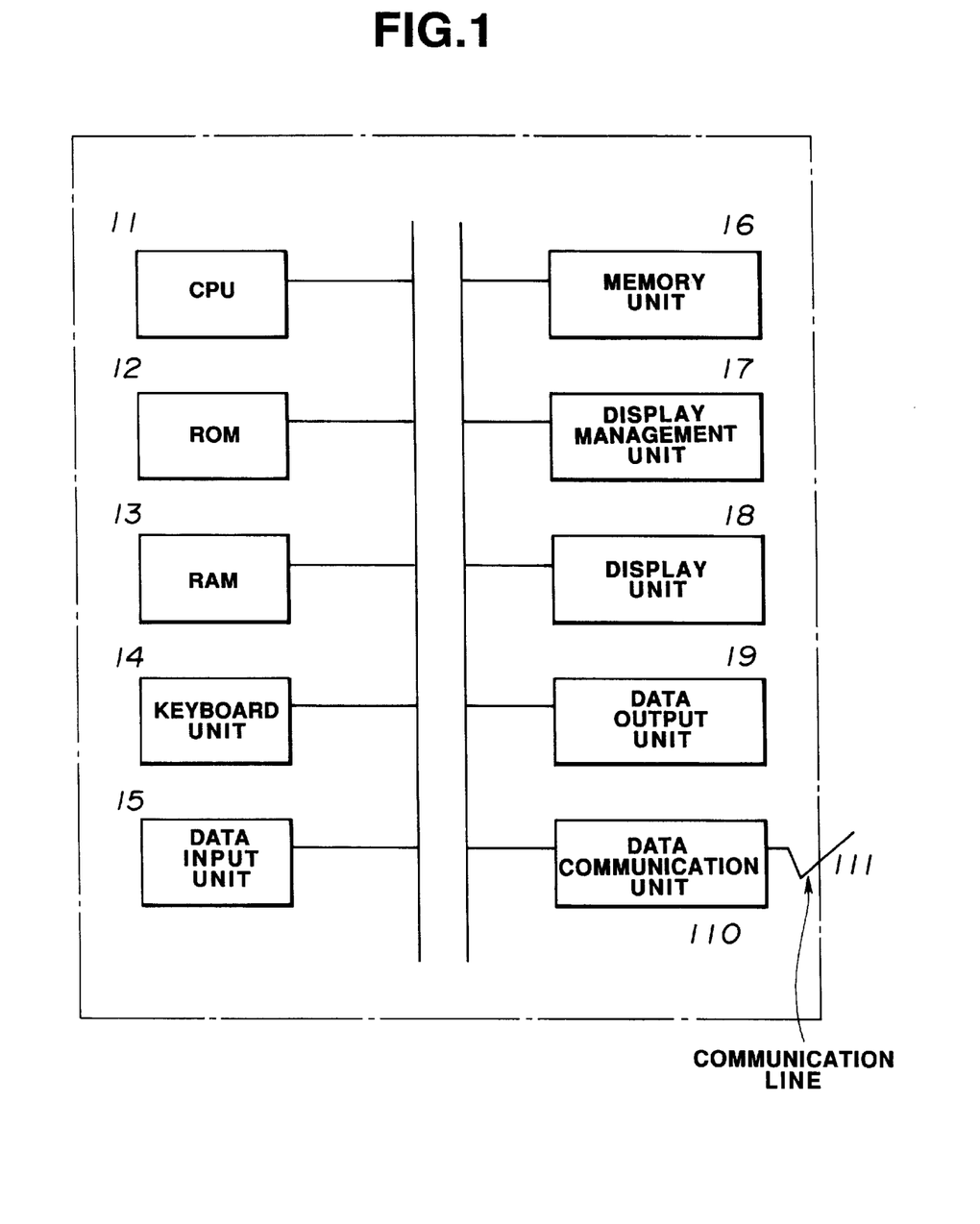
FIG. 1 is a block diagram showing an outline construction of a facsimile apparatus according to a first embodiment.

FIG. 1 is a block diagram which shows an outline construction of a facsimile apparatus according to a first embodiment. In FIG. 1, numeral 11 denotes a CPU (a control processing unit) which controls the entire apparatus. The CPU 11 is composed of a micro-computer etc.

Numeral 12 denotes a ROM (a read-only memory) in which a computer program for controlling is stored.

Numeral 13 denotes a RAM (a random access memory) in which several kinds of information are stored.

Figure 2:
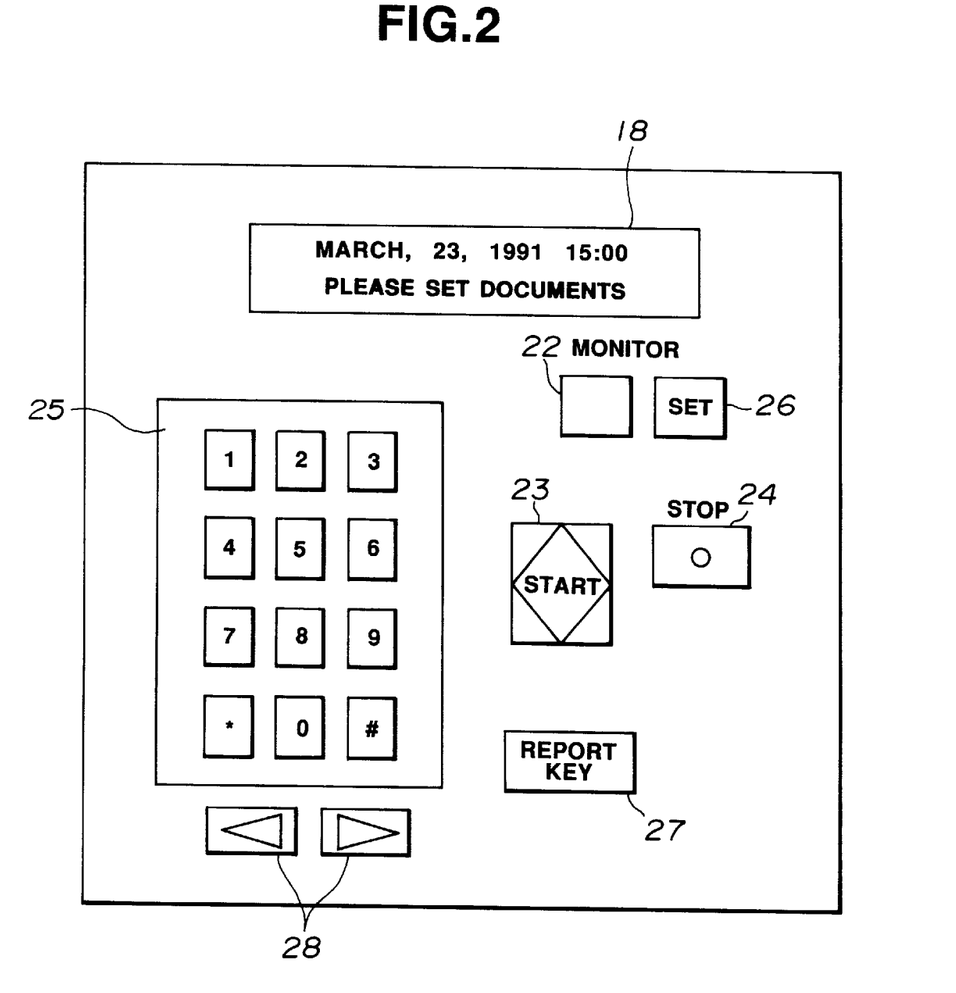
FIG. 2 is a view showing an operation unit according to the first embodiment.

Numeral 14 denotes a key board unit consisting of several types of keys shown in FIG. 2.

Numeral 15 denotes a data input unit for inputting image data. The data input unit 15 reads a document and outputs a digitalized signal as an image signal (image data).

Numeral 16 denotes a memory unit for storing image data (including received image data and read image data) which is composed of one of a magnetic memory device, an optical-magnetic memory device, etc.

Figure 4:
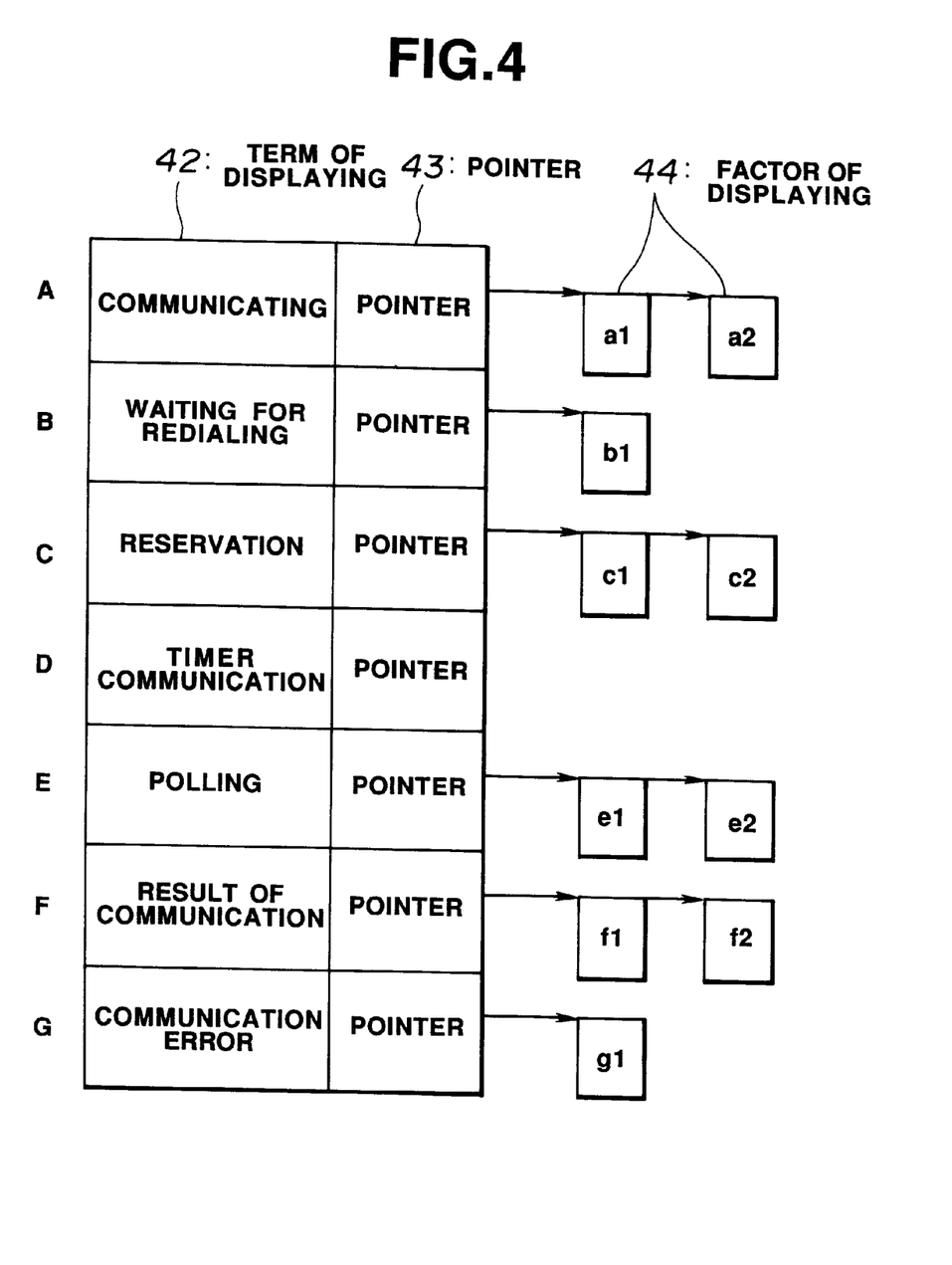
FIG. 4 is a view showing management data for displaying.

Numeral 17 denotes display management unit in which data for managing a display operation, shown by FIG. 4, is stored.

Figure 3:
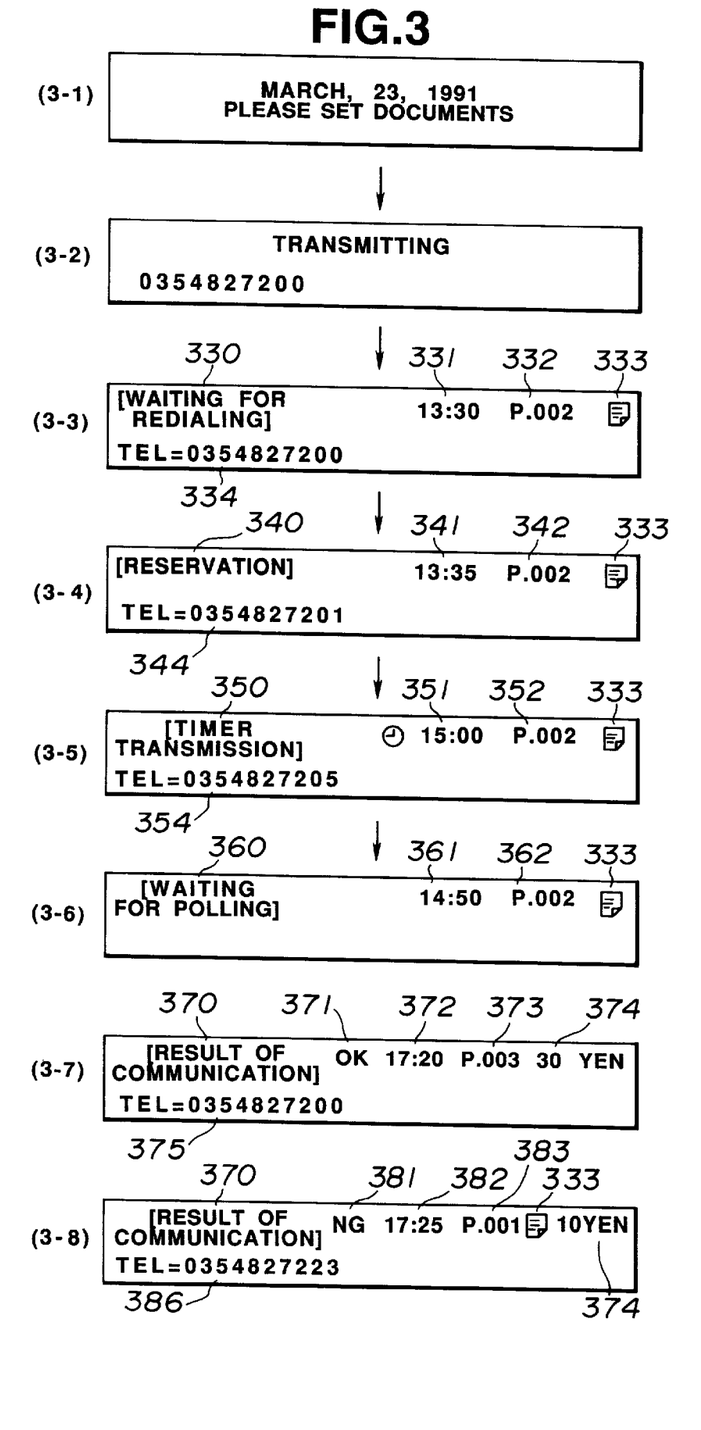
FIG. 3 is a view showing a condition of sequentially changing contents displayed by a display unit in response to each manual instruction.

Numeral 18 denotes a display unit which sequentially displays several kinds of information as shown in FIG. 3. The display unit 18 comprises a LCD (a liquid-crystal display device), LEDs (light emitting diodes), etc. The display unit 18 and the key board unit 14 may be composed, on the whole, as an operation unit shown in FIG. 2.

Numeral 19 denotes a data output unit which prints out image data in accordance with a control operation by CPU 11. The data output unit 19 may be a thermal printer, an electro-photographic printer, etc.

Numeral 110 denotes a data communication unit for transmitting data and receiving data through a communication line 111. The communication line 111 is a line of ISDN (Integrated Services Digital Network), and comprises a D-channel and plural B-channels. The data communication unit 110 is able to effect plural data communication in parallel by using the plural B-channels. The detailed construction of the data communication unit 110 is shown in U.S. Pat. No. 5,142,568 (issued on Aug. 25, 1992).

FIG. 2 is a view showing an operation unit (key board unit 14 and display unit 18 of FIG. 1). In FIG. 2, numeral 22 denotes a monitor key for changing a content displayed by the display unit 18. Numeral 23 denotes a start key for starting several kinds of operations, for example, data communication, a copying operation, etc. Numeral 24 denotes a stop key for suspending the operation effected by the apparatus. Numeral 25 denotes keys for dialing and inputting information (i.e. the number of copying). Numeral 26 denotes a set key for setting a mode (i.e. a dialing mode, a transmission mode, a reception mode, a copy mode). Numeral 27 denotes a report key for entering a manual instruction for printing out a report corresponding to several kinds of information to be displayed. Numeral 28 denotes keys for shifting a cursor displayed by the display unit 18.

FIG. 3 is a view showing the changing conditions of the display unit 18 in accordance with inputs of monitor key 22 (as shown in FIG. 2). In FIG. 3, numeral 3-1 shows the condition of the display unit 18 while the apparatus is in a stand-by state. Then, if an operator pushes the monitor key 22, the display unit 18 changes from the condition indicated by numeral 3-1 to the condition indicated by numeral 3-2. Condition 3-2 indicates the condition of the display unit during data transmission. If the operator pushes the monitor key 22, the display unit 18 changes from the condition indicated by numeral 3-2 to the condition indicated by numeral 3-3. Condition 3-3 indicates the condition of the display when the apparatus is waiting for a predetermined time to elapsing to redial. Numeral 330 indicates that the apparatus is in a condition of waiting for redialing. Numeral 331 indicates the present time. Numeral 332 indicates the number of documents which a set transmission consists of. In condition 3-3, the set transmission has two documents. A mark of a number 333 indicates that the image data of the set transmission has been stored in the memory unit 16. Numeral 334 indicates the telephone number of the destination to which the set image data has been transmitted.

If the operator pushes the monitor key 22, the display unit 18 changes from condition 3-3 to the condition indicated by numeral 3-4. Condition 3-4 indicates the display at a time when a reservation of data transmission has been set. Numeral 340 indicates that the reservation of data transmission has been set. Numeral 341 indicates a time when image data of the reserved transmission was stored in the memory unit 16.

Numeral 342 indicates the number of stored documents. In condition 3-4, image data corresponding to two documents has been stored in the memory unit 16. Numeral 344 indicates the telephone number of the destination of the reserved transmission. If the operator pushes the monitor key 22, the display unit 18 changes from condition 3-4 to the condition indicated by numeral 3-5. Condition 3-5 has a display which shows that a timer communication has been set. Numeral 350 indicates that a timer transmission has been set. Numeral 351 indicates the time of effecting the timer transmission. Numeral 352 indicates the number of documents of the timer transmission. Numeral 354 indicates the telephone number of a destination of the timer transmission. If the operator pushes the monitor key 22, the display unit 18 changes from condition 3-5 to the condition indicated by numeral 3-6. Condition 3-6 has a display which shows that image data for polling has been stored in the memory unit 16. Numeral 360 indicates that image data for polling has been stored. Numeral 361 indicates the time when the image data for polling has been stored. In FIG. 3, the image data for polling has been stored at 14:50. Numeral 362 indicates the number of documents of the image data for polling. If the operator pushes the monitor key 22, the display unit 18 changes from condition 3-6 to a condition indicated by a numeral 3-7. Condition 3-7 has a display which shows the result of data communication. In condition 3-7, numeral 371 indicates that the data communication has been completed. Numeral 372 indicates the time of having finished the data communication. In condition 3-7, the data communication has been finished at 17:20. Numeral 373 indicates the number of documents of the data communication. In condition 3-7, three documents have been transmitted to a destination indicated by numeral 375. Numeral 374 indicates the cost of transmitting data. If the operator pushes the monitor key, the display unit 18 changes from condition 3-7 to the condition indicated by numeral 3-8, which shows another result of data communication. In condition 3-8, numeral 381 indicates that data communication has not been completed. Numeral 382 indicates the time of having effected the data communication to a destination indicated by a numeral 386. Numeral 383 indicates the number of documents of the data communication. In condition 3-8, one document has not been transmitted and data corresponding to the document have been still stored in the memory unit 16. As described above, the apparatus can effect plural data communications in parallel. Therefore, if the apparatus effects plural data communications and the operator pushes the monitor key 22 in condition 3-2, the display unit 18 displays a condition, which indicates that another data communication has been effected, instead of condition 3-3. If plural conditions are in each of conditions 3-3 through 3-6, the display unit 18 displays another term in the same condition in response to an input of the monitor key 22.

FIG. 4 is a view which shows an example of management data for displaying stored information in the display management unit 17. In FIG. 4, numeral 42 denotes a kind of term of displaying corresponding to each of the conditions 3-2 through 3-8. Numeral 43 denotes a pointer which indicates if a factor of displaying is or not. Numeral 44 denotes the factors of displaying.

A term A is a display management block for indicating the condition of communicating corresponding to the condition 3-2 of FIG. 3. In FIG. 4, two data communications are effected by the apparatus. Two factors a1.a2 have been set into the pointer of the term A. A term B is a display indicating a condition of block for management waiting for re-dialing corresponding to condition 3-3 of FIG. 3. In FIG. 4, one communication is in a condition of re-dialing, and one factor b1 has been set in the pointer of the term B. A term C is a display management block for indicating the condition of reservation of data communication corresponding to condition 3-4 of FIG. 3. In FIG. 4, two reservations of data communication have been set, and two factors C1, C2 have been set into the pointer of the term C. A term D is a display management block for indicating the condition of setting timer-communication corresponding to condition 3-5 of FIG. 3. In FIG. 4, any timer communication isn't set. A term E is a display management block for polling corresponding to condition 3-6 of FIG. 3. In FIG. 4, two of data for polling are set into the apparatus, and two factors e1, e2 have been set into the pointer of the term E. A term F is a display management block for indicating a result of data communication being completed corresponding to condition 3-7 of FIG. 3. In FIG. 4, two of data communications have been completed, and two factors f1, f2 have been set into the pointer of the term F. A term G is a display management block for indicating a result of data communication being incomplete corresponding to condition 3-8 of FIG. 3. In FIG. 4, one of data communication has been incompleted, and one factor g1 has been set into the pointer of the term G. If the operator pushes the monitor key 22, CPU 11 discriminates if a factor is set into a pointer of a term or not. Then CPU 11 causes the display unit 18 to display a condition corresponding to the factor. For example, if the operator pushes on the monitor key 22 in a condition of the display unit 18 displaying the term B, CPU 11 discriminates if any factor is set into the pointer of the term C or not, and CPU 11 causes the display unit 18 to display a condition corresponding to the factor C1. Next, if the operator pushes the monitor key 22, CPU 11 discriminates if another factor is set into the pointer of the term C or not. In FIG. 4, because another factor C2 has been set, CPU 11 causes the display unit 18 to display a condition corresponding to the factor C2. On the other hand, if another factor isn't set into the pointer of the term C, CPU 11 discriminates if any factor is set into the pointer of the next term D. In FIG. 4, because no factor is set into the pointer of the term D, CPU 11 discriminates if any factor is set into the pointer of the term E or not. Then CPU 11 causes the display unit 18 to display a condition corresponding to factor e1.

Figure 5:
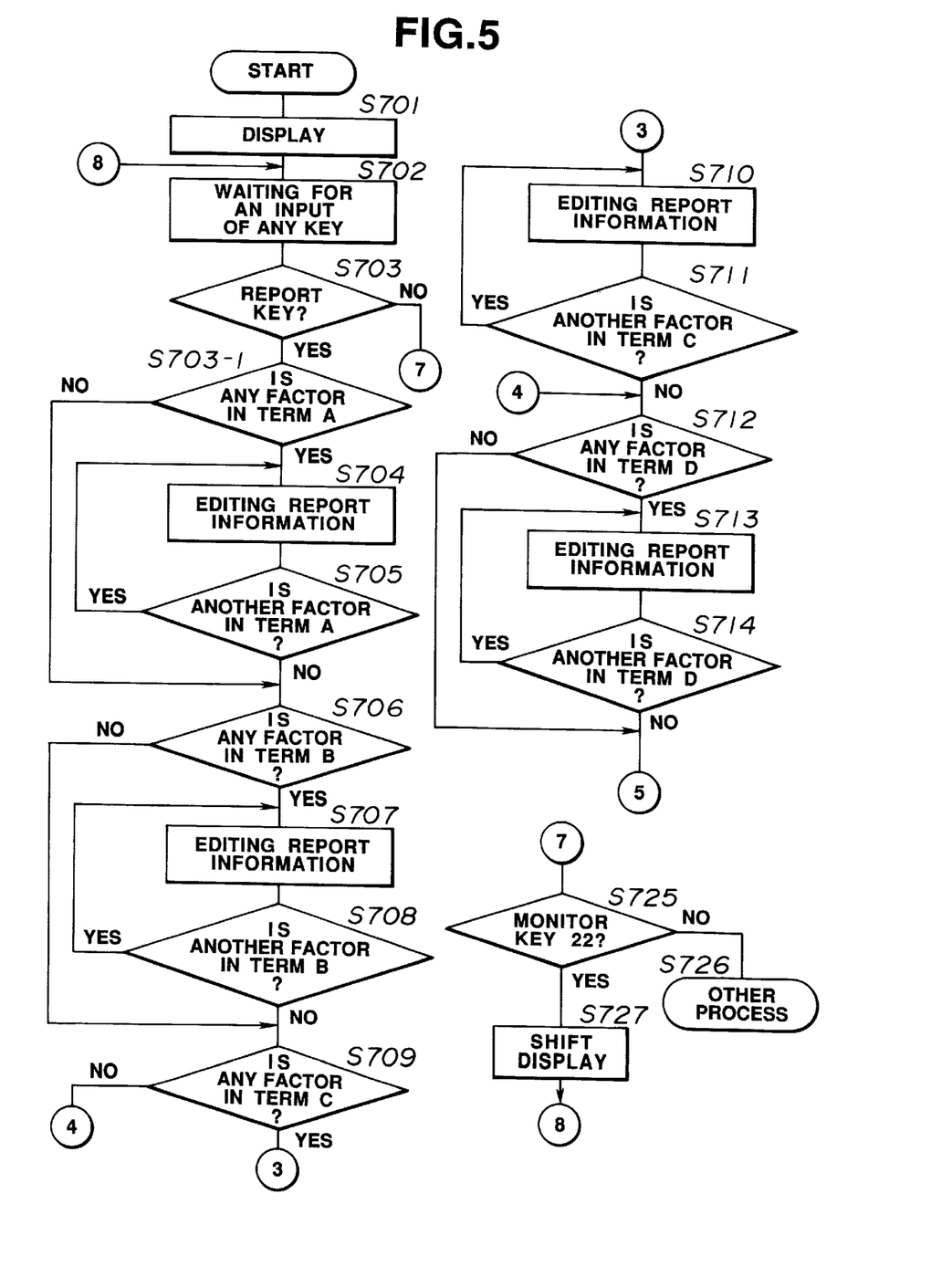
FIG. 5 is a flow chart showing a control operation according to the first embodiment.
Figure 6:
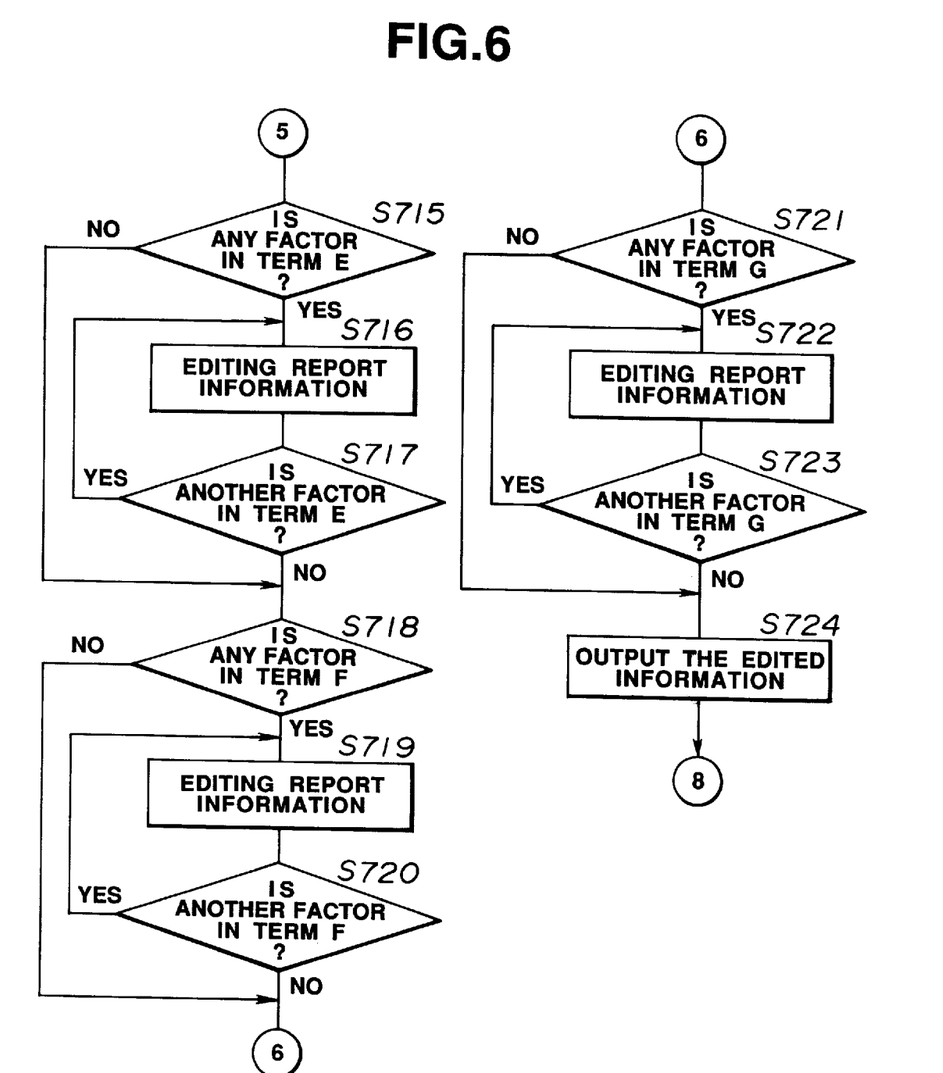
FIG. 6 is a flow chart further showing the control operation according to the first embodiment.

FIG. 5 and FIG. 6 are flow charts showing a control operation for printing and displaying in the first embodiment.

In step S701, CPU 11 causes the display unit 18 to display condition 3-1 of FIG. 3. In step S702, the CPU 11 waits for an input of any key. If the operator pushes any key, the CPU 11 discriminates if the pushed key is the report key 27 in step S703. In step S703, if the pushed key is not the report key 27, the CPU 11 shifts from step S703 to step S725. In step S725, CPU 11 discriminates if the pushed key is the monitor key 22. If the pushed key is the monitor key 22, CPU 11 causes the display unit 18 to display another condition in the above described manner in step S727 and then shifts from step S727 to step S702. If the pushed key is not the monitor key 22, the CPU 11 shifts from step S725 to step S726 which then effects another process corresponding to the pushed key in step S726.

In step S703, if the pushed key is the report key 27, the CPU 11 shifts from step S703 to step S703-1. In step S 703-1 through step S 724, CPU 11 causes the data output unit 19 to print out information relating to the information to be displayed by the display unit 18. In step S703-1, the CPU 11 discriminates if any factor is set into the pointer of the term A (FIG. 4) or not. If a factor is not set into the pointer of the term A, the CPU 11 shifts from step S703-1 to step S706. If a factor is not set into the pointer of the term A (during communicating), the CPU 11 edits information for printing corresponding to the factor of the term A, and stores the edited information into RAM 13 in step S704. Then in step S705, CPU 11 discriminates if another factor is set into the pointer of the term A or not. If another factor is set, the CPU 11 shifts from step S705 to step S704 for further editing. If another factor is not set, the CPU 11 shifts from step S705 to step S706, where the CPU 11 discriminates if a factor is set into the pointer of the term B during waiting for redialing. In step S706, step S707 and step S708, the CPU 11 edits information for printing relating to the term B in the same manner as step S703-1, step S704 and step S705. In step S709, step S710 and step S711, the CPU 11 edits information for printing material relating to the term C (a reserved communication) in the same manner as step S703-1, step S704 and step S705. In step S712, step S713 and step S714, the CPU 11 edits information for printing relating to the term D (a timer communication) in the same manner as step S703-1, step S704 and step S705. In step S715, step S716 and step S717, the CPU 11 edits information for printing relating to the term E (polling communication) in the same manner as step S703-1, step S704 and step S705. In step S718, step S719 and step S720, the CPU 11 edits information for printing related to the term F (a result of the completed communication) in the same manner as step S703-1, step S704 and step S705. In step S721, step S722 and step S723, the CPU 11 edits information for printing related to the term G (a result of the incompleted communication) in the same manner as step S703-1, step S704 and step S705.

Next, in step S724, the CPU 11 causes the data output unit 19 to print out the edited information stored in RAM 13. Then after printing has ended, the CPU 11 shifts from step S724 to step S702.

In the above described manner, the information relating to each of the term A through term G is printed out. The operator can quickly know his desired information by watching the printed information without entering many instructions for shifting a display.

Figure 14:
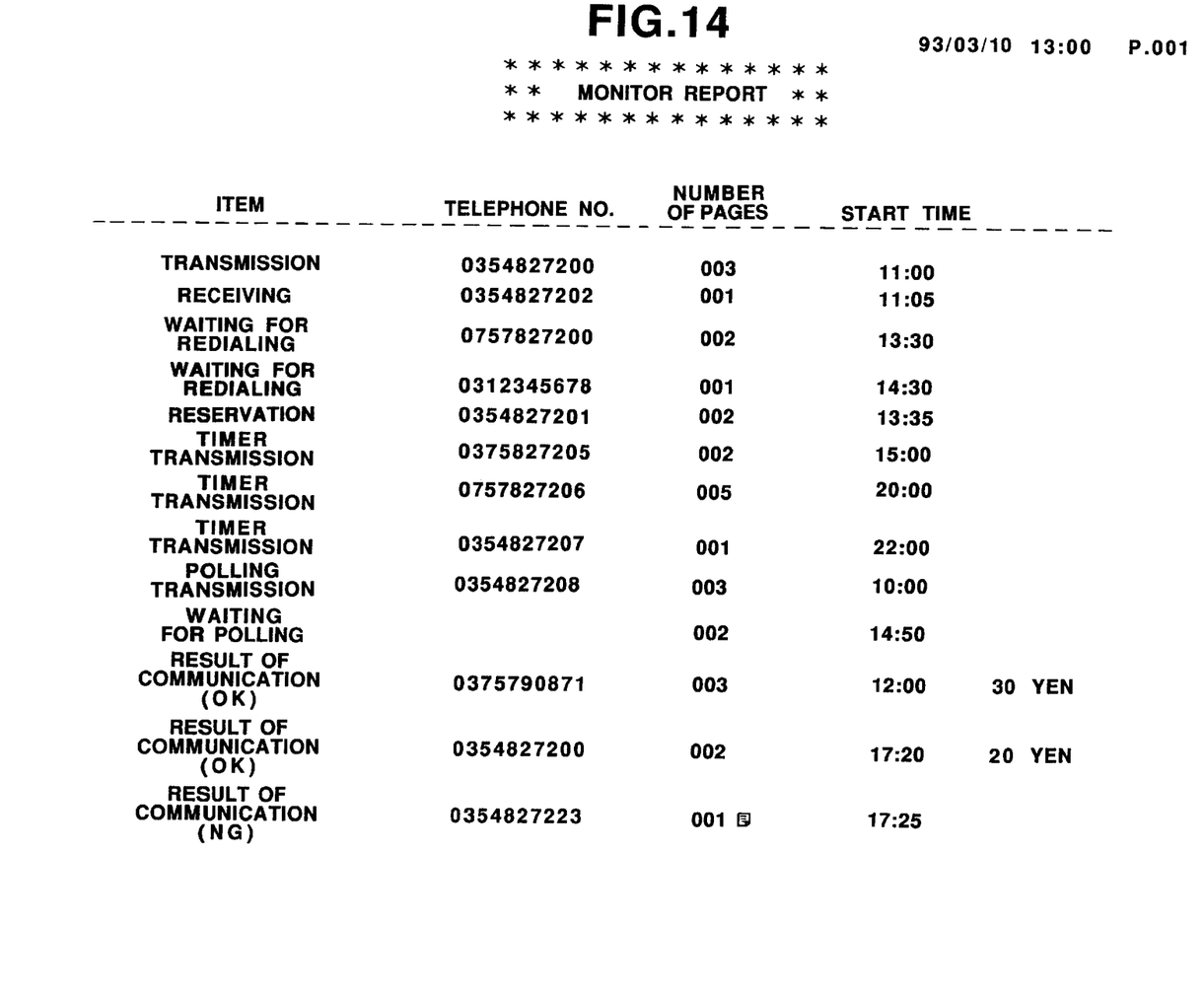
FIG. 14 is a view showing an example of a monitor report according to the first embodiment.

FIG. 14 is a view showing an example of a monitor report according to the first embodiment.

Next, a second embodiment according to the present invention will be described.

Figure 7:
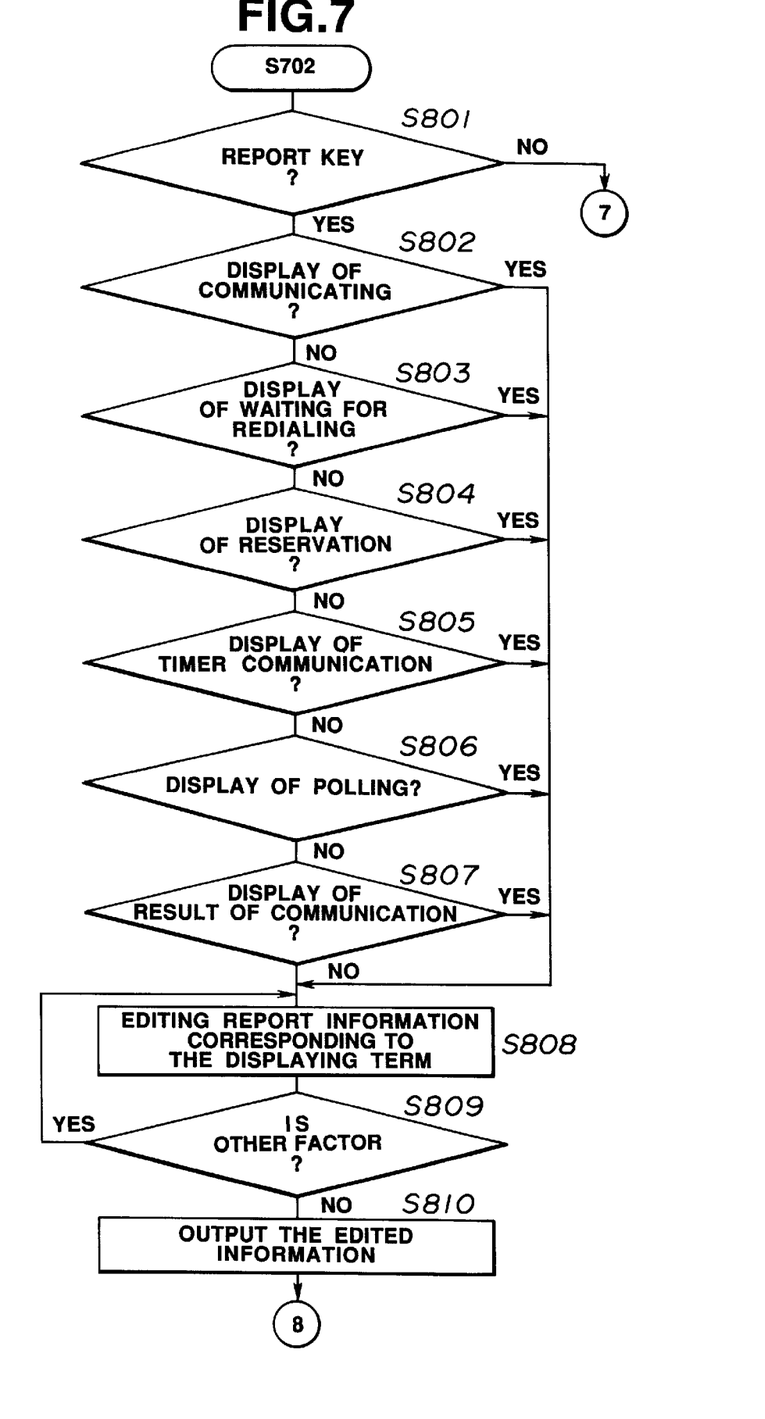
FIG. 7 is a flow chart showing a control operation according to a second embodiment.

In the above described first embodiment, if the operator pushes the report key 27, the information relating to each of terms A through G is printed out. In the second embodiment, the operator is able to select information of the term to be printed. The hardware construction of the apparatus of the second embodiment is the same as that of FIG. 1. FIG. 7 is a flow chart showing a control operation effected by CPU 11 in the second embodiment. The control operation of the second embodiment and that of FIG. 5 is the same through step S702. From step S702 of FIG. 5, if a key is pushed the CPU 11 shifts from step S702 to step S801 of FIG. 7. Then in step S801, the CPU 11 discriminates if the pushed key is the report key 27 or not. If the pushed key is not the report key 27, the CPU 11 shifts from step S801 to step S725 of FIG. 5. If the pushed key is the report key 27, the CPU 11 discriminates which term has displayed by the display unit 18 in step S802 to step S807. Then in step S808, the CPU 11 edits information to be printed corresponding to a factor of the discriminated term and stores the edited information into RAM 13. Then, in step S809, the CPU 11 discriminates if another factor is set into the pointer of the discriminated term or not. If another factor is set, the CPU 11 shifts from step S809 to step S808 for further editing. If another factor is not set, the CPU 11 shifts from step S809 to step S810 and then causes the data output unit 19 to print out the edited information stored in RAM 13. Then after the edited information has been printed out, the CPU 11 shifts from step S810 to step S702 of FIG. 5.

In the above-described second embodiment, the information corresponding to the term having been displayed by the display unit 18 is selected and printed out in response to an input of the report key 27.

Figure 15:
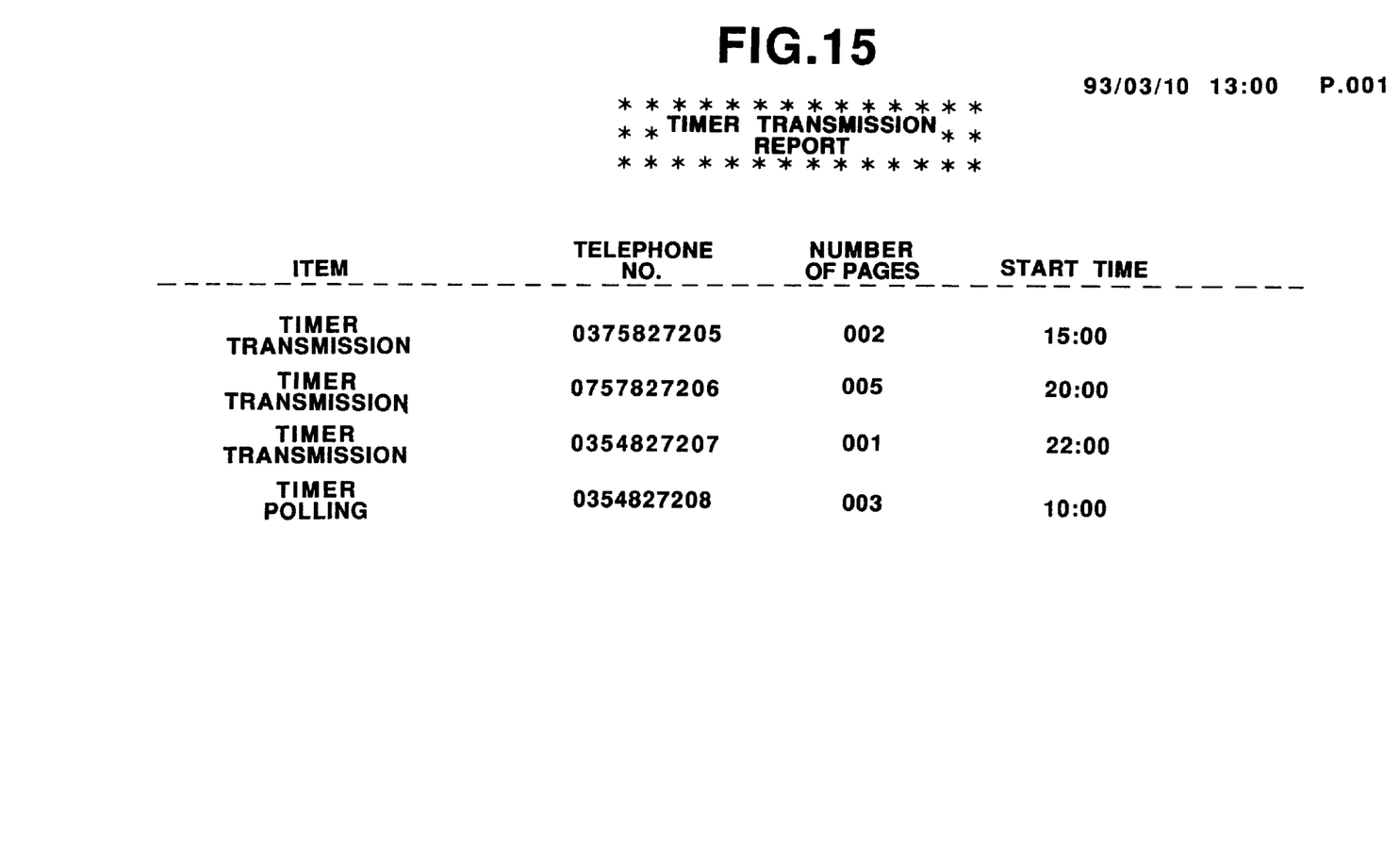
FIG. 15 is a view showing an example of the timer transmission report according to the second embodiment.

FIG. 15 is a view showing an example of a timer transmission report according to the second embodiment. The timer transmission report is printed out in response to the import of the report key 27 while the information corresponding to the term D has been displayed by the display unit 18.

Next, a third embodiment according to the present invention will be described.

In the above-described first embodiment, the information of all terms for displaying is printed out in response to the input of the report key 27. However, the apparatus has to take a fixed time for printing out the information of all terms. The apparatus according to the present invention has a function of being able to effect plural kinds of operation in parallel. Therefore, if the data of the display management unit 17 is updated during the editing of the information to be printed out or printing out the edited information, undesirable information may be printed out by the apparatus. In the third embodiment, the CPU 11 reads the data from the display management unit 17 and stores the read data into another buffer memory (i.e. a predetermined area of RAM 13) in response to the input of the report key 27, the CPU 11 then edits the information to be printed in accordance with the data kept in RAM 13, so that information corresponding to the content of the display management unit 18, when the report key 27 is pushed, will be printed out.

Figure 8:
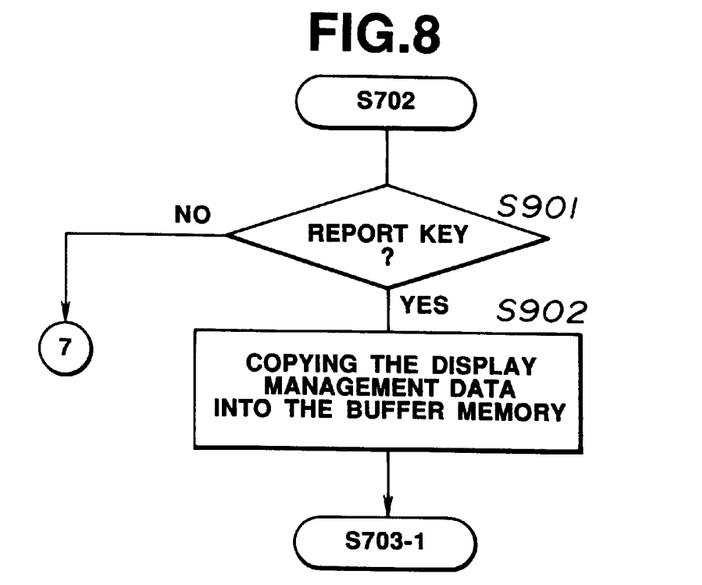
FIG. 8 is a flow chart showing a control operation according to a third embodiment.

FIG. 8 is a flow chart showing a control operation in the third embodiment. In the third embodiment, the CPU 11 shifts from step S702 of FIG. 5 to step S901 of FIG. 8. Then in step S901, the CPU 11 discriminates if the report key 27 has been pushed. If the report key has been pushed, the CPU 11 shifts from step S901 to step S902. In step S902, CPU 11 copies the data of the display management unit 18 into the buffer memory (i.e. the predetermined area of RAM 13). Hereafter, the CPU 11 edits the information to be printed out on the basis of the copied data in RAM 13 in the same way as step S703-1 through step S723 of the first embodiment.

Next, a fourth embodiment according to the present invention will be described. In the fourth embodiment, the CPU 11 prohibits an additional operation (i.e. a receiving operation, or a dialing operation) to be started during the period of editing the information and printing the edited information, so that the information relating to the display at a time when the report key 27 has been pushed can be printed out.

Figure 9:
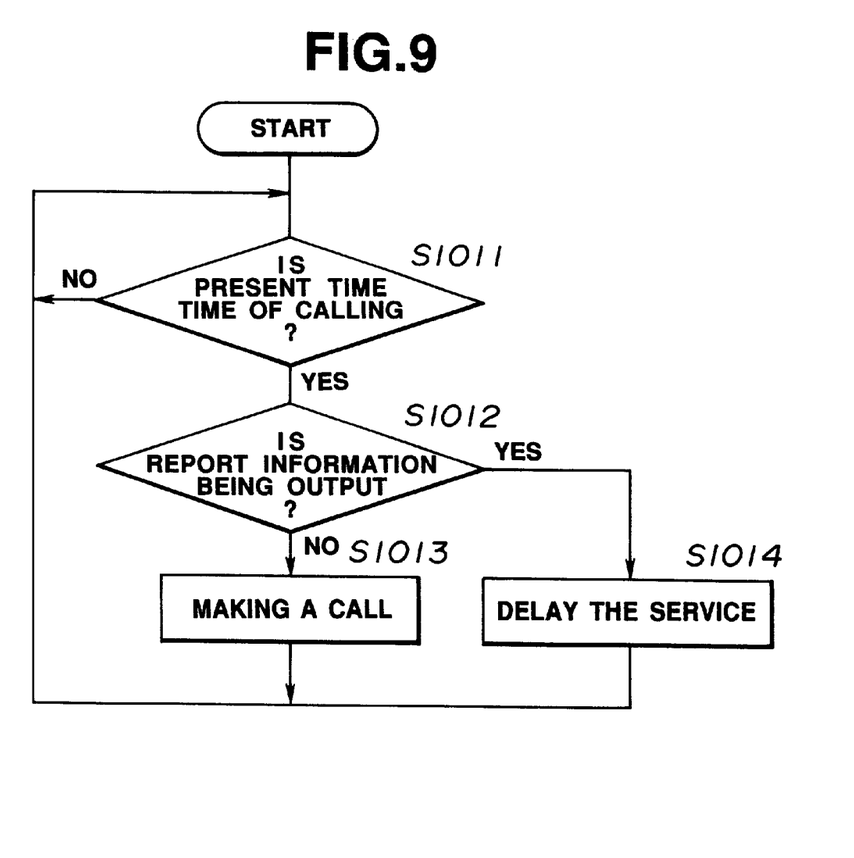
FIG. 9 is a flow chart showing a control operation for calling according to a fourth embodiment.
Figure 10:
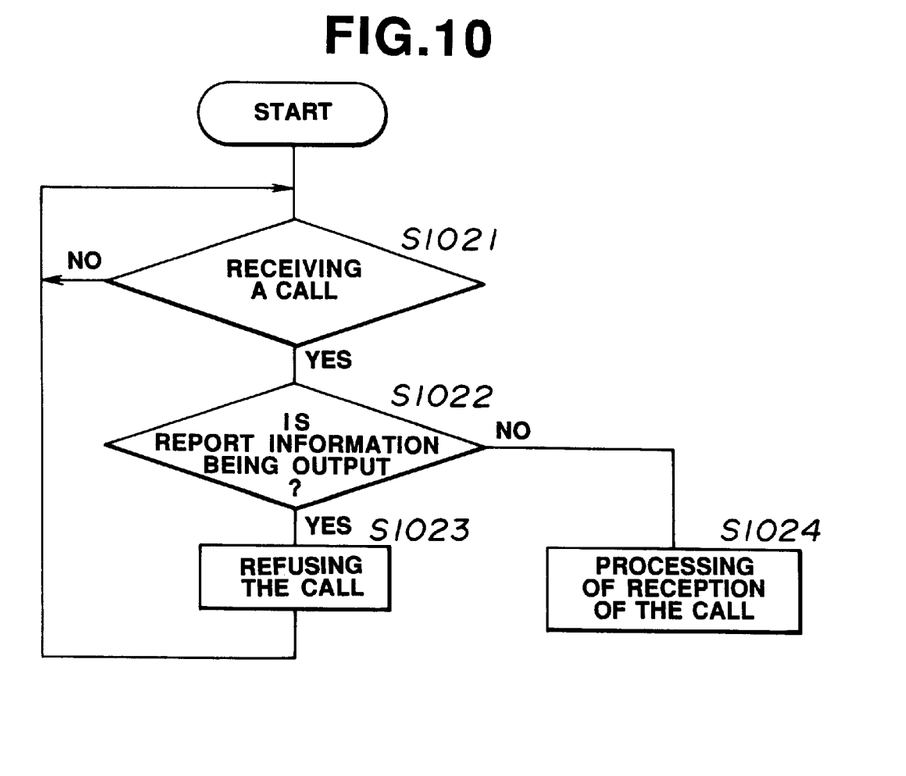
FIG. 10 is a flow chart showing a control operation for receiving according to the fourth embodiment.

FIG. 9 is a flow chart showing a control operation for calling in the fourth embodiment. FIG. 10 is a flow chart showing a control operation for receiving a call in the fourth embodiment.

Figure 11:
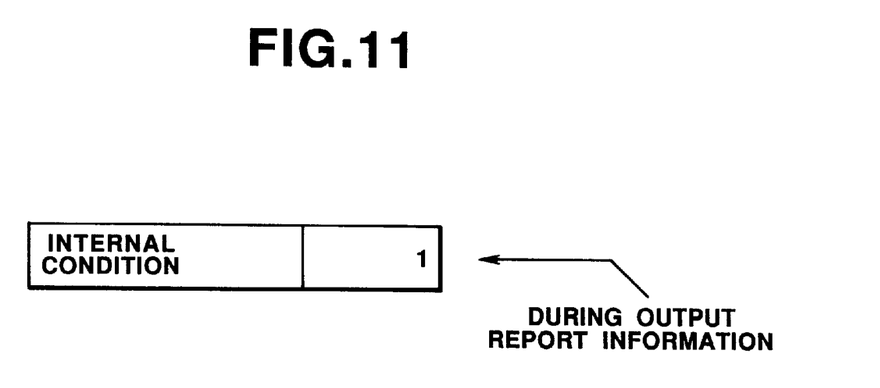
FIG. 11 is a view showing a flag which indicates if the printing device is active or inactive.

In step S1011 of FIG. 9, the CPU 11 discriminates if any request of calling is set or not and if a present time reaches a time for calling corresponding to the request for calling. If the present time reaches the time for calling, the CPU 11 shifts from step S1011 to step S1012. If the present time does not reach the time for calling, the CPU 11 waits until the time for calling. In step S1012, the CPU 11 discriminates if the data output unit 19 is printing out the information related to the display or not. If the data output unit 19 is printing out, the CPU 11 waits until the end of the printing operation. When the data output unit 19 finishes printing out the information, the CPU 11 effects the request of calling waited by step S1014 in step S1013. FIG. 11 is a view showing a flag that indicates if the data output unit 19 is printing or not. The CPU 11 discriminates a condition of the data output unit 19 on the basis of the flag shown in FIG. 11. The flow chart of FIG. 9 is effected by CPU 11 when any requested of calling has been set.

In step S1021 of FIG. 10, the CPU-11 discriminates if the data communication unit 10 has received a call. If a call has been received, the CPU-11 shifts from step S1021 to step S1022, wherein the CPU 11 discriminates if the data output unit 19 is printing out the information. If the data output unit 19 is printing out, in step S1023 the CPU 11 prohibits effecting a receiving operation response to the call. If the data output unit 19 is not printing, CPU 11 effects the receiving operation response to the call in step S1024.

Next, a fifth embodiment will be described. In the fifth embodiment, the CPU 11 prohibits entry of any key while the data output unit 19 is printing out the information response to the input of the report key 27, so that the set factors in the display management unit 18 cannot be changed by any key during the period of printing out the information related to the display.

Figure 12:
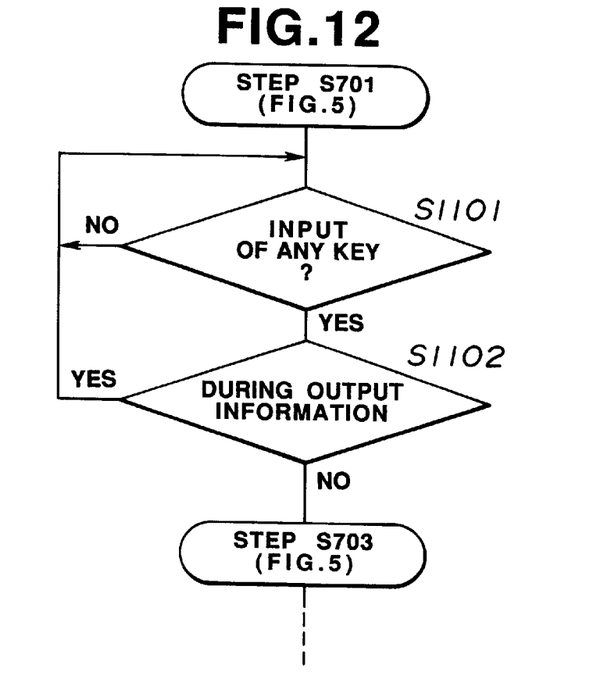
FIG. 12 is a flow chart showing a control operation according to a fifth embodiment.

FIG. 12 is a flow chart showing a control operation in the fifth embodiment. In the fifth embodiment, the CPU 11 effects step S1101 and step S1102 in place of step S702 in FIG. 5.

In step S1101, the CPU 11 discriminates if a key has been pushed. If a key has been pushed, the CPU 11 discriminates if the data output unit 19 is printing out the information related to the display in step S1102. If the data output unit 19 is printing, the CPU 11 ignores any key entry.

Figure 13:
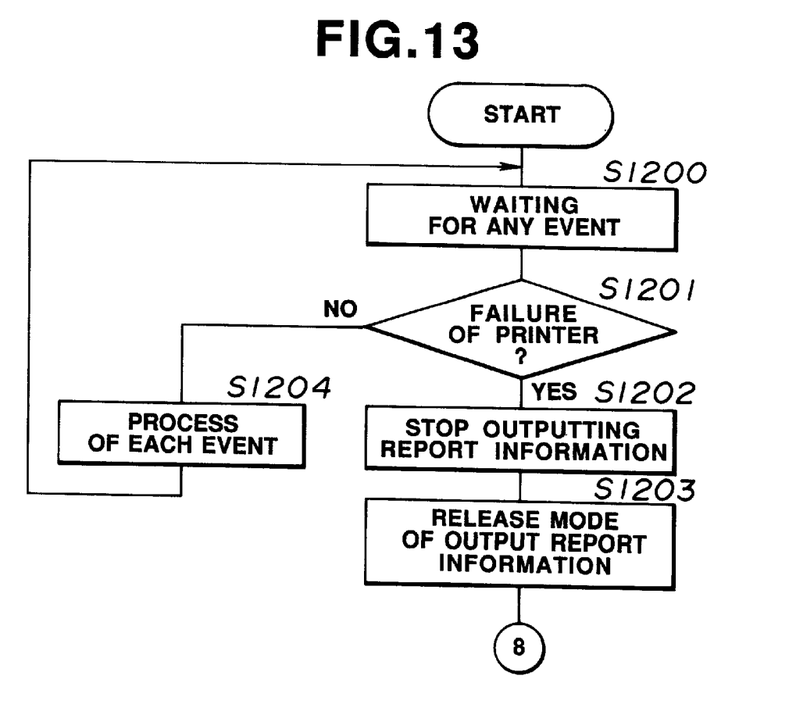
FIG. 13 is a flow chart showing a control operation for checking a failure of the data output unit.

FIG. 13 is a flow chart showing a control operation for checking a failure of the data output unit 19 (a printer) during the period of printing out the information related to the display.

In step S1200, the CPU 11 waits for an entry of any event (dialing, receiving, or sending, etc.). In step S1201, the CPU 11 discriminates if the data output unit 19 has failed. If the data output unit 19 does not have any failure, the CPU 11 effects some operation corresponding to the event in step S1204. If the data output unit 19 has had some failure (e.g., paper jam), the CPU 11 suspends the printing operation by the data output unit 19 in step S1202. Then, the CPU 11 resets the flag of FIG. 11 in step S1203 and returns to step 702 of FIG. 5.

The foregoing embodiments have been limited to a facsimile apparatus, but the present invention is applicable to any data communication apparatus having a display unit and a data output having a display unit and a data output unit (a printer), such as a telefax apparatus.

Also, the present invention is not limited to the foregoing embodiments but is subject to various modifications.

We claim:

1. A data communication apparatus comprising:

generating means for generating several kinds of communication information in accordance with a condition of the apparatus;

storing means for storing the several kinds of communication information in a hierarchical structure having an item and a factor according to the item;

display means for displaying the item of the several kinds of communication information stored in said storing means in response to each manual instruction from a key for updating a display;

printing means for printing data; and control means, responsive to an instruction for printing, for extracting detail information to be printed based on the factor relating to each of the items of the several kinds of displayed communication information, and controlling said printing means to printout the detail information, wherein said control means controls said printing means to print out the detail information which is not displayed relating to the selected information which is displayed and refusing reception of a call until after said printing means prints out the detail information.

2. A data communication apparatus according to claim 1, wherein said control means selects the communication information, which is displayed on said display means, from the several kinds of communication information.

3. A data communication apparatus according to claim 1, wherein the several kinds of communication information to be displayed include information which indicates a condition for communicating, information which indicates a condition of making a call, and information which indicates a result of data communication.

4. A data communication according to claim 1, wherein each of the several kinds of communication information to be displayed has at least one condition or at least one result.

5. The data communication apparatus according to claim 1, wherein the instruction for printing is a manual instruction from a key.

6. The data communication apparatus according to claim 1, wherein said control means prohibits entry of any key until after the printer prints out the detail information.

7. A data communication method, comprising the steps of:
generating several kinds of communication information in accordance with a condition of the apparatus;
causing a storage memory to store the several kinds of communication information in a hierarchical structure having an item and a factor according to the item;
causing a display to display the item of the several kinds of communication information stored in response to each manual instruction from a key for updating a display;
extracting, in response to an instruction for printing, detail information to be printed based on the factor relating to each of the items of the several kinds of displayed communication information;
causing a printer to print out the detail information, wherein the detail information which is not displayed relating to the selected information which is displayed is printed; and
refusing reception of a call until after the printer prints out the detail information.

8. A data communication method according to claim 7, further comprising the step of selecting the communication information, which is displayed, from the several kinds of communication information.

9. A data communication method according to claim 7, wherein the several kinds of communication information to be displayed include information which indicates a condition for communicating, information which indicates a condition of making a call, and information which indicates a result of data communication.

10. A data communication method according to claim 7, wherein each of the several kinds of communication information to be displayed has at least one condition or at least one result.

11. The data communication method according to claim 7, wherein the instruction for printing is a manual instruction from a key.

12. The data communication method according to claim 7, wherein the entry of any key is prohibited until after the printer prints out the detail information.

* * * * *

UNITED STATES PATENT AND TRADEMARK OFFICE
CERTIFICATE OF CORRECTION

PATENT NO.     : 6,151,133
DATED          : November 21, 2000
INVENTOR(S)    : Tomomi Sakauchi et al.

Page 1 of 1

It is certified that error appears in the above-identified patent and that said Letters Patent is hereby corrected as shown below:

<u>Title page,</u>
Item [54] Title: line 3, "IS" should read -- ARE --.
Item [56] References Cited: FOREIGN PATENT DOCUMENTS,
"1-270137   10/199   Japan" should read -- 1-270167   10/1989   Japan --.

<u>Column 1,</u>
Line 3, "IS" should read -- ARE --.

Signed and Sealed this

Twenty-eighth Day of May, 2002

*Attest:*

JAMES E. ROGAN
*Attesting Officer*   *Director of the United States Patent and Trademark Office*